(12) United States Patent
Chen

(10) Patent No.: US 7,464,439 B2
(45) Date of Patent: Dec. 16, 2008

(54) HINGE

(75) Inventor: Wei-Chun Chen, Shulin (TW)

(73) Assignee: Shin Zu Co., Ltd., Taipei Hsien (TW)

( * ) Notice: Subject to any disclaimer, the term of this patent is extended or adjusted under 35 U.S.C. 154(b) by 462 days.

(21) Appl. No.: 11/396,583

(22) Filed: Apr. 4, 2006

(65) Prior Publication Data

US 2007/0234515 A1 Oct. 11, 2007

(51) Int. Cl.
*E05D 11/08* (2006.01)
(52) U.S. Cl. .............................. 16/340; 16/330; 16/374
(58) Field of Classification Search .......... 16/337–339,
16/342, 330, 303, 374, 376, 377, 340; 361/680–683,
361/814; 455/90.3, 575.1, 575.3, 575.8;
379/433.12, 433.13; 348/373, 333.01, 333.06,
348/794
See application file for complete search history.

(56) References Cited

U.S. PATENT DOCUMENTS

| | | | | |
|---|---|---|---|---|
| 6,421,878 B1 * | 7/2002 | Kaneko et al. | ................. | 16/330 |
| 6,779,234 B1 * | 8/2004 | Lu et al. | ........................ | 16/340 |
| 6,862,779 B1 * | 3/2005 | Lu et al. | ........................ | 16/340 |
| 2004/0093690 A1 * | 5/2004 | Lu et al. | ........................ | 16/330 |
| 2005/0155183 A1 * | 7/2005 | Lu et al. | ........................ | 16/340 |
| 2005/0235459 A1 * | 10/2005 | Amano | ........................ | 16/330 |
| 2005/0278895 A1 * | 12/2005 | Su | ............... | 16/340 |
| 2006/0000060 A1 * | 1/2006 | Lu et al. | ........................ | 16/340 |
| 2006/0200945 A1 * | 9/2006 | Lu et al. | ........................ | 16/340 |
| 2006/0265839 A1 * | 11/2006 | Lu | ............... | 16/342 |
| 2007/0136992 A1 * | 6/2007 | Lu et al. | ........................ | 16/330 |
| 2007/0169312 A1 * | 7/2007 | Ho et al. | ........................ | 16/330 |
| 2007/0174996 A1 * | 8/2007 | Lu et al. | ........................ | 16/340 |

* cited by examiner

*Primary Examiner*—Chuck Y. Mah
(74) *Attorney, Agent, or Firm*—Rabin & Berdo, P.C.

(57) ABSTRACT

A hinge is mounted between a cover and a base and has a bracket, a limiting element, a shaft and a pin. The bracket has a lug and a plate attached to the base. The lug has at least one positioning notch. The limiting element has two sides, a limiting protrusion protruding from one side and at least one positioning protrusion protruding from the other side which corresponds to and engages the positioning notch. The shaft has two ends, a head and a stop. One end of the shaft sequentially extends through the limiting element and the lug. The head, on which the stop is formed, is formed between the two ends of the shaft. The stop selectively abuts against the limiting protrusion. The other end of the shaft is attached to the cover. The pin is mounted securely in the lug and the limiting element.

3 Claims, 8 Drawing Sheets

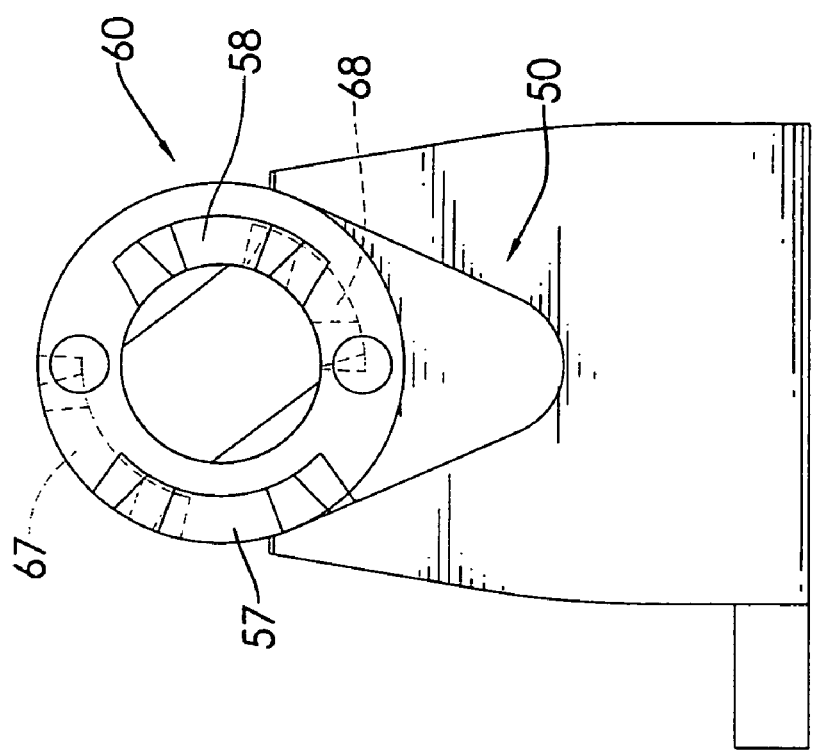
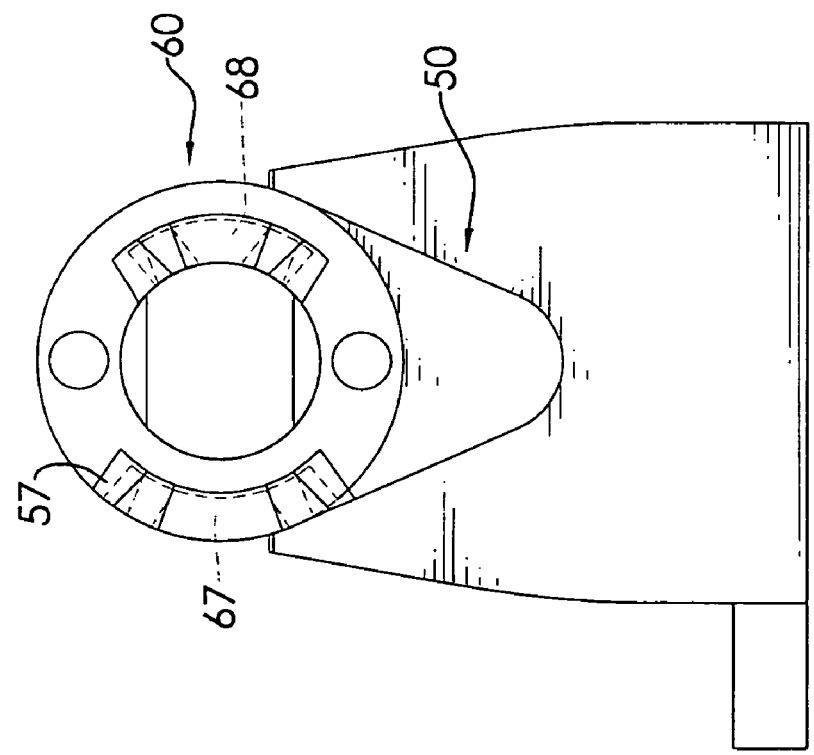
FIG.7B
FIG.7A

HINGE

BACKGROUND OF THE INVENTION

1. Field of the Invention

The present invention relates to a hinge, especially to a hinge mounted in an electrical appliance to allow a cover to pivot relative to a base.

2. Description of the Prior Art

Electrical appliances like cell phones and notebook computers comprise a cover, a base and a hinge. The hinge is mounted between the cover and the base to enable the cover and the base to pivot relative to each other. With reference to FIG. 8, one of such conventional hinges comprises a stationary bracket (81), a limiting element (82), a rotating bracket (83) and a nut (84) and may have multiple spacers (96) and multiple resilient discs (97).

The stationary bracket (81) comprises a horizontal plate (85) and a vertical lug (86). The plate (85) is mounted on the base of the electrical appliance. The lug (86) comprises a through hole (87) and two cuts (88). The through hole (87) is formed through the lug (86) and the cuts (88) are formed respectively in two lateral sides of the lug (86).

The limiting element (82) has a non-circular fixing hole (89) and a limiting protrusion (91). The fixing hole (89) is formed through the limiting element (82) corresponding to the through hole (87) of the lug (86). The limiting protrusion (91) protrudes axially out of limiting element (82) around the fixing hole (89) of the limiting element (82) and selectively abuts against the cuts (88) of the lug (86).

The shaft (83) comprises a head (95), a first end, a second end and a thread segment (92). The thread segment (92) is formed on the first end of the shaft (83). The first end serially mounts through the limiting element (82), the spacer (96), the lug (86) of the stationary bracket (81) and the resilience discs (97). The nut (84) screws on the thread segment (92) to hold the limiting element (82), the spacer (96), the lug (86) of the stationary bracket (81) and the resilience discs (97) against the head (95) of the shaft (83).

The rotating bracket (83) is mounted securely on the second end of the shaft (83) and is attached to mount the cover of the electrical appliance.

When the cover of the electrical appliance pivots relative to the base, the rotating bracket (93) rotates the shaft (83) and the limiting element (82) is rotated by the rotating shaft (83). Because the cuts (88) of the lug (86) selectively abut against the limiting protrusion (91) of the limiting element (82), the rotating angle of the shaft (83) and the limiting element (82) are limited.

The limiting protrusion (91) strikes the cuts (88) of the lug (86) when the limiting protrusion (91) abuts against the cuts (88) of the lug (86). Because the striking force focuses on the cuts (88) of the lug (86), the lug (86) becomes fatigue due to accumulation of the striking forces and may be broken from the cuts (88).

To overcome the shortcomings, the present invention provides a hinge that disperses the striking force to the bracket lug and provides hints on approaching rotating limits to mitigate or obviate the aforementioned problems.

SUMMARY OF THE INVENTION

The main objective of the invention is to provide a hinge that disperses the striking force to the bracket lug.

The hinge in accordance with the present invention is mounted between a cover and a base of an electrical appliance and has a bracket, a limiting element, a shaft, a pin and an optional spacer.

The bracket comprises a lug and a plate. The lug is formed on and extends upward from the plate and has a through hole, a fastening hole and at least one positioning notch. The through hole is formed through the lug. The fastening hole is formed through the lug near the through hole. The at least one positioning notch is formed on lateral sides of the lug. The plate is attached to the base of the electrical appliance.

The limiting element has a first side, a second side, a through hole, a fastening hole near the through hole, a limiting protrusion protruding from the second side of the limiting element and at least one positioning protrusion protruding from the first side of the limiting element. The through holes of the limiting element and the bracket correspond to each other, and the fastening holes of the limiting element and the bracket correspond to each other. The at least one positioning protrusion corresponds to and engages the at least one positioning notch of the bracket.

The shaft comprises a first end, a head, a second end and a stop. The first end is mounted through the limiting element and the lug of the bracket in sequence. The second end of the shaft is attached to the cover. The head is formed between the first end and the second end of the shaft. The stop is formed on the head and selectively abuts against the limiting protrusion of the limiting element.

The pin is mounted securely in the fastening holes of the limiting element and the lug of the bracket.

The spacer is annular and is mounted around the shaft between the limiting element and the lug of the bracket.

The hinge in accordance with the present invention may further comprise a fixing element and a ridge wheel.

The fixing element has a first side, a second side, a through hole, at least one positioning protrusion and at least one detent, and is mounted around the shaft adjacent to the lug of the bracket.

The through hole is formed through the fixing element.

The at least one positioning protrusion is formed on the first side of the fixing element and corresponds to and engages the at least one positioning notch of the lug of the bracket.

The at least one detent is formed in multiple levels on the second side of the fixing element along the through hole.

The ridge wheel has a side, a fixing hole and at least one ridge, and is mounted securely on the shaft that the side of the ridge wheel faces the second side of the fixing element.

The fixing hole is formed through the ridge wheel and is non-circular that the ridge wheel is rotated with the shaft.

The at least one ridge is formed in multiple levels on the side of the ridge wheel, corresponds to and selectively engages the at least one detent on the second side of the fixing element.

Other objectives, advantages and novel features of the invention will become more apparent from the following detailed description when taken in conjunction with the accompanying drawings.

BRIEF DESCRIPTION OF THE DRAWINGS

FIG. 7A is an operational end view of the fixing element and the ridge wheel of the hinge in FIG. 4;

FIG. 7B is another operational end view of the fixing element and the ridge wheel of the hinge in FIG. 4.

DETAILED DESCRIPTION OF THE PREFERRED EMBODIMENTS

Figure 1:
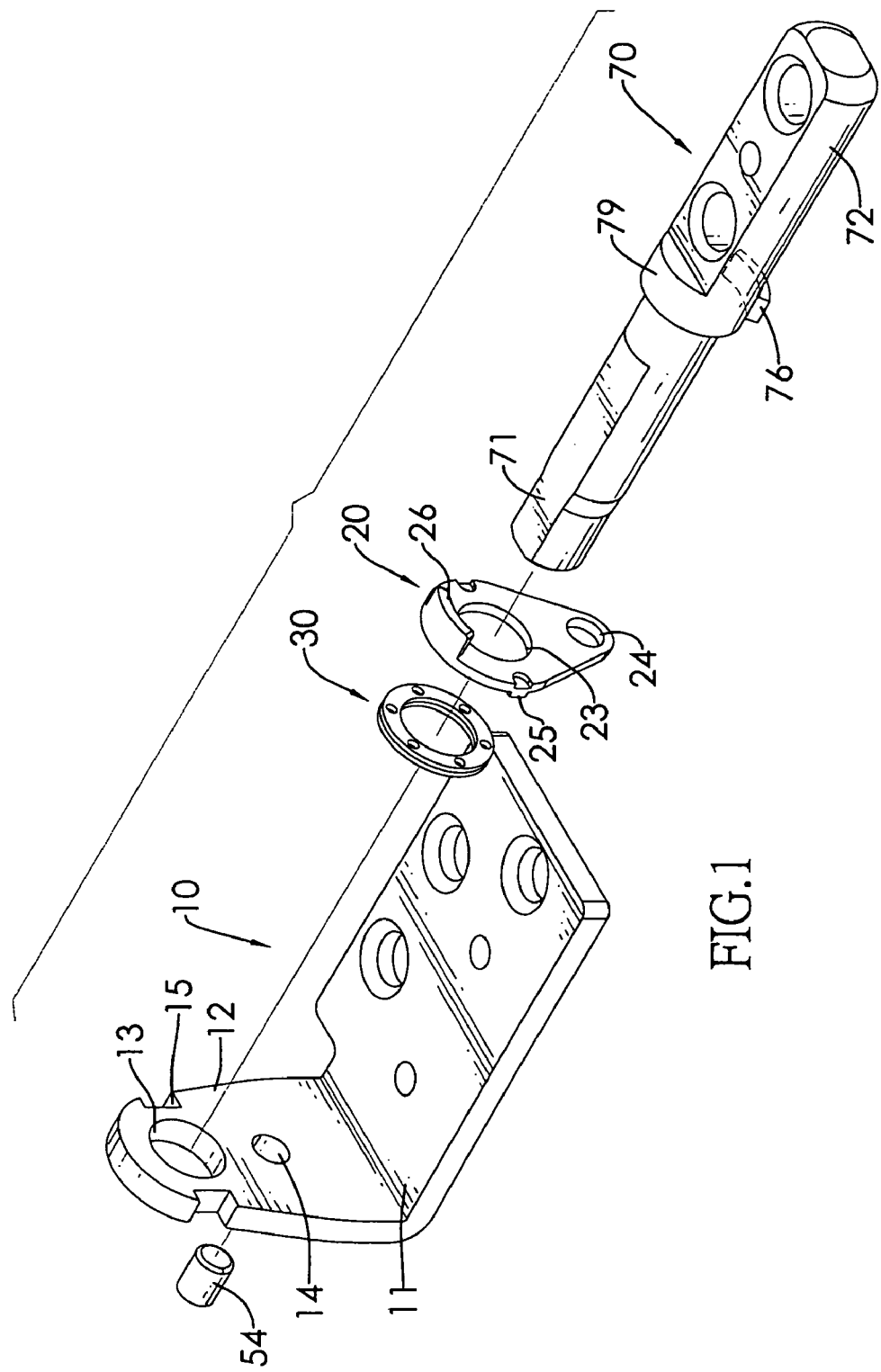
FIG. 1 is an exploded perspective view of a first embodiment of a hinge in accordance with the present invention.

With reference to FIG. 1, a first embodiment of a hinge in accordance with the present invention is mounted between a cover and a base of an electrical appliance and has a bracket (10), a limiting element (20), a shaft (70), a pin (54) and an optional spacer (30).

The bracket (10) comprises a lug (12) and a plate (11). The lug (12) is formed on and extends upward from the plate (11) and has two lateral sides, a through hole (13), a fastening hole (14) and two positioning notches (15). The through hole (13) is formed through the lug (12). The fastening hole (14) is formed through the lug (12) near the through hole (13). The two positioning notches (15) are formed on the lateral sides of the lug (12). The plate (11) is attached to the base of the electrical appliance.

The limiting element (20) is connected to the lug (12) of the bracket (10) and has a first side, a second side, a through hole (23), a fastening hole (24), a limiting protrusion (26) and two positioning protrusions (25). The through hole (23) is formed through the limiting element (20) and corresponds to the through hole (13) in the bracket (10). The fastening hole (24) is formed through the limiting element (20) and corresponds to the fastening hole (14) in the bracket (10). The limiting protrusion (26) protrudes from the second side of the limiting element (20). The positioning protrusions (25) protrude from the first side of the limiting element (20) and correspond to and engage the positioning notches (15) of the bracket (10).

The shaft (70) comprises a first end (71), a second end (72), a head (79) and a stop (76). The first end (71) is mounted through the limiting element (20) and the lug (12) of the bracket (10) in sequence. The second end (72) of the shaft (70) is attached to the cover of the electrical appliance. The head (79) is formed between the first end (71) and the second end (72) of the shaft (70). The stop (76) is formed on the head (79) and selectively abuts against the limiting protrusion (26) of the limiting element (20).

The pin (54) is mounted securely in the fastening holes (14)(24) of the limiting element (20) and the lug of the bracket (10).

The spacer (30) is annular and is mounted around the shaft (70) between the limiting element (20) and the lug (12) of the bracket (10).

Figure 2:
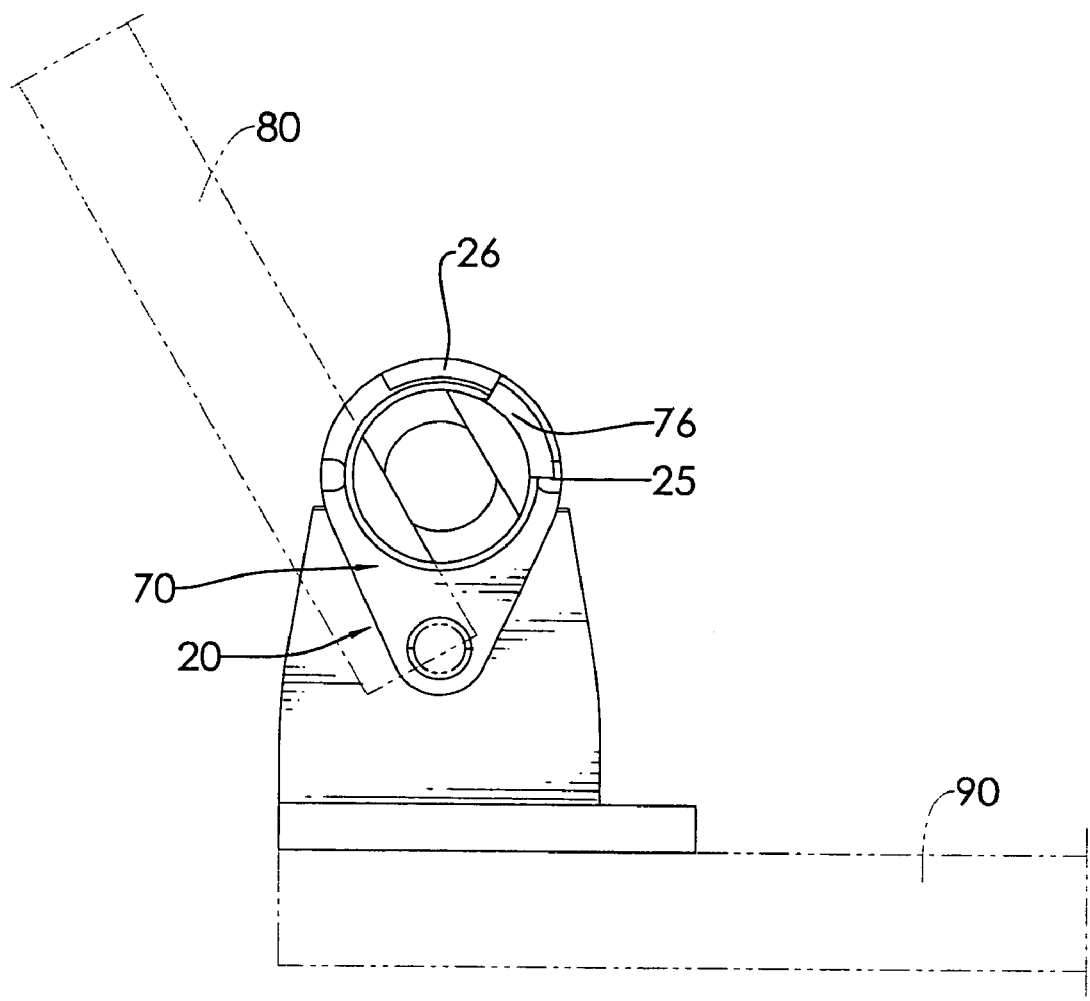
FIG. 2 is an operational end view of the hinge in FIG. 1 with the cover opened.
Figure 3:
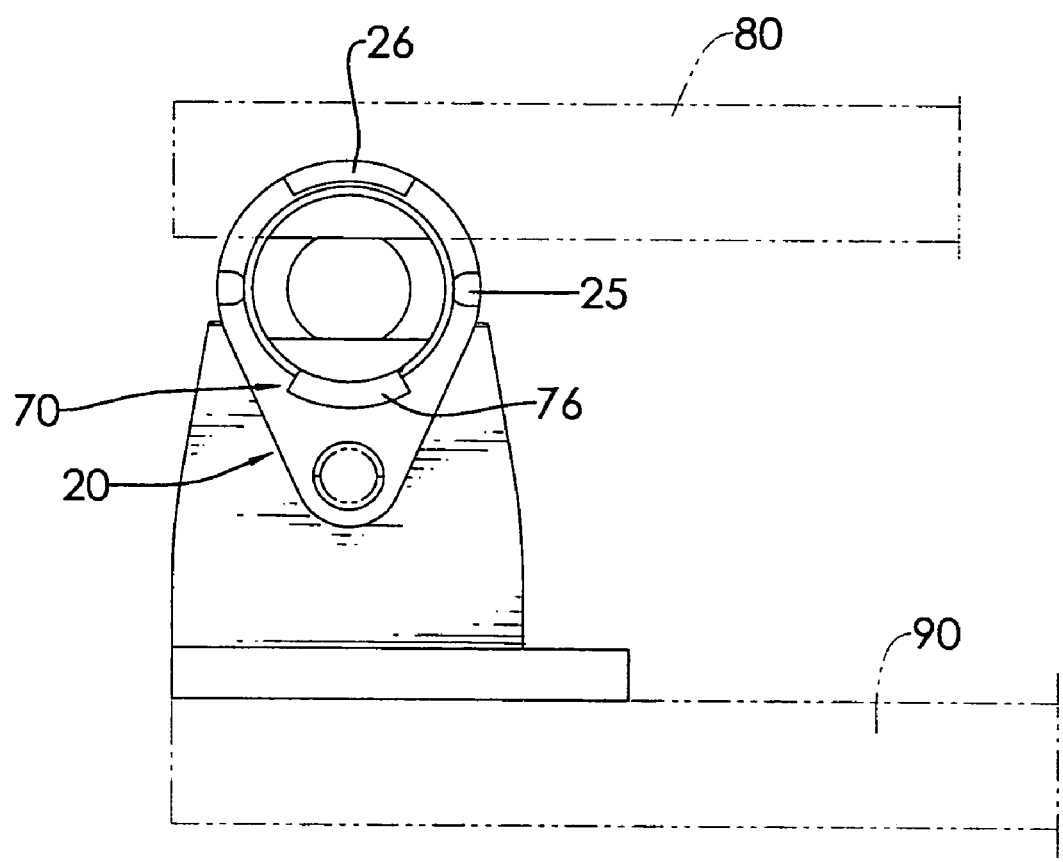
FIG. 3 is another operational end view of the hinge in FIG. 1 with the cover closed.

With further reference to FIGS. 2 and 3, when the cover (80) of the electrical appliance is opened, the cover (80) rotates the shaft (70) until the stop (76) strikes the limiting protrusion (26). The striking force is shared by the two positioning protrusions (25) and the pin (54). When the cover (80) of the electrical appliance is closed, the stop (76) slides away from the limiting protrusion (26) and the cover (80) returns to a closed position without having the stop (76) strike the limiting protrusion (26) again.

Figure 4:
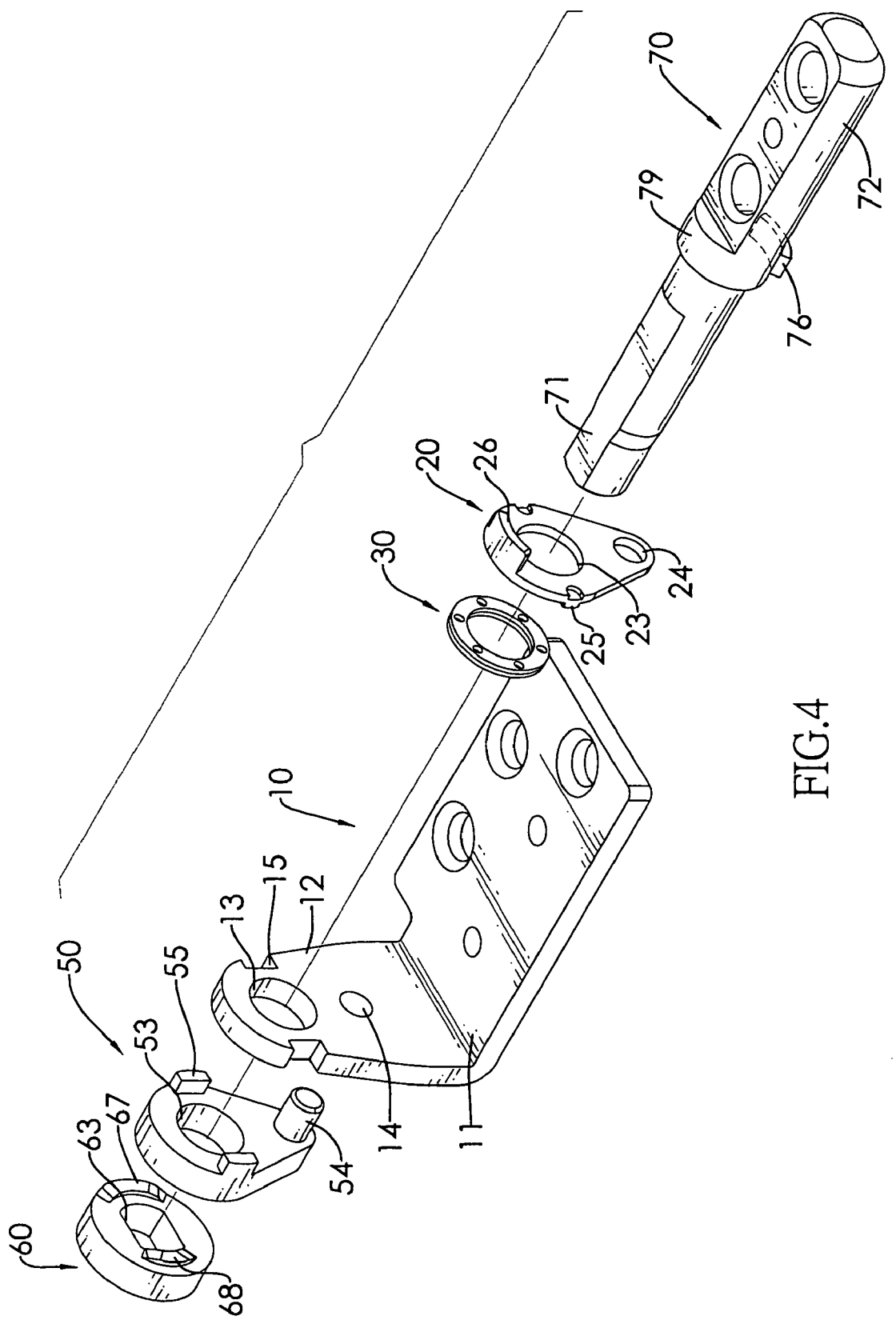
FIG. 4 is an exploded perspective view of a second embodiment of a hinge in accordance with the present invention.
Figure 5:
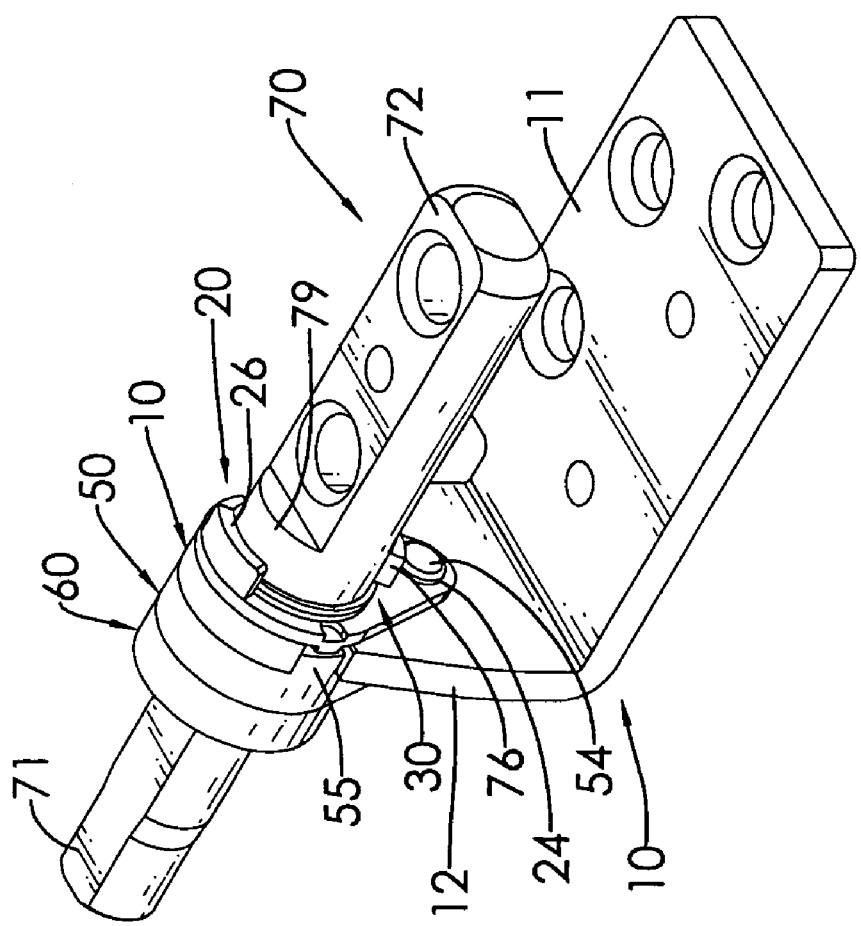
FIG. 5 is a perspective view of the hinge in FIG. 4.
Figure 6:
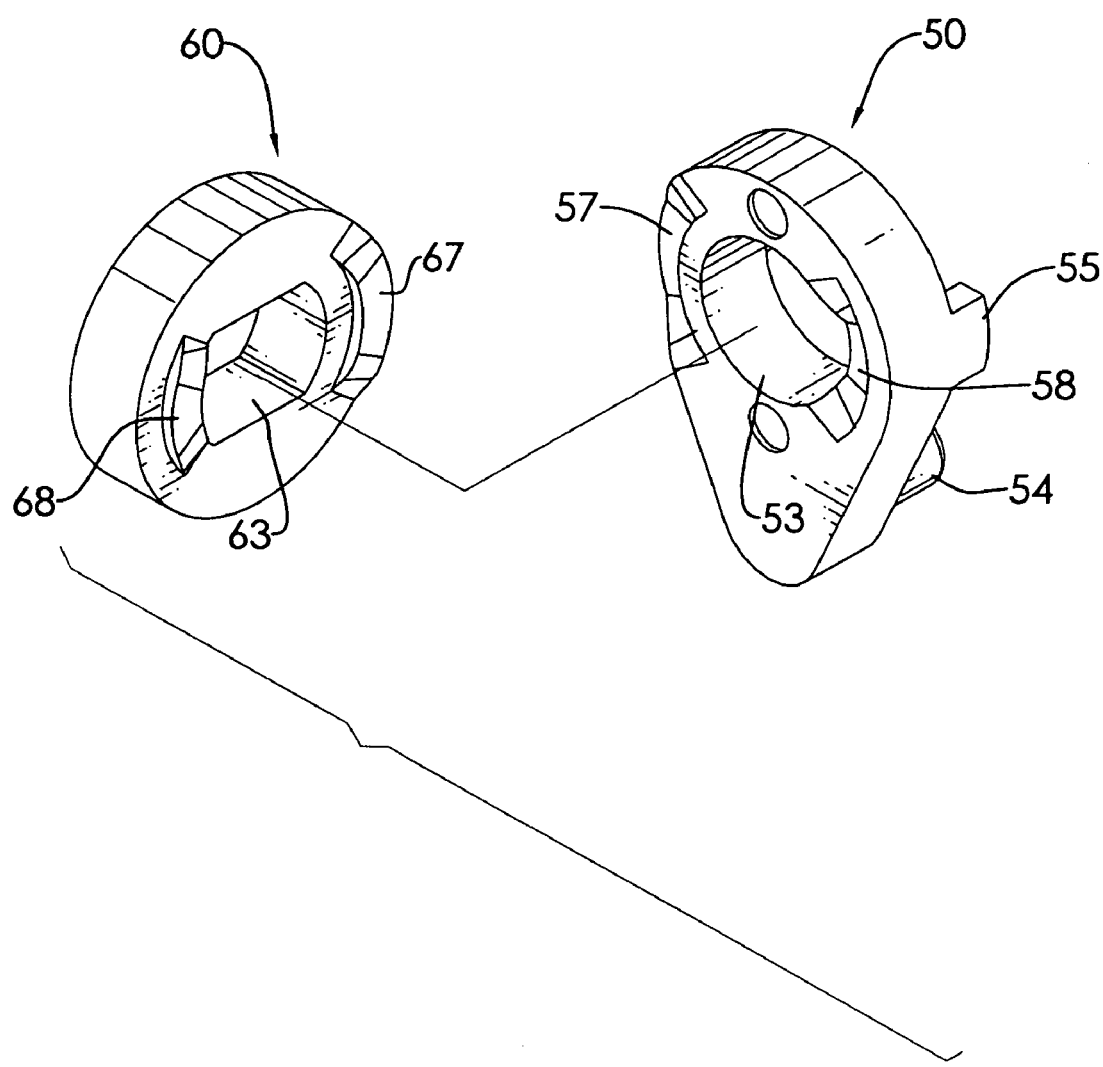
FIG. 6 is an exploded perspective view of the fixing element and the ridge wheel of the hinge in FIG. 4.
Figure 8:
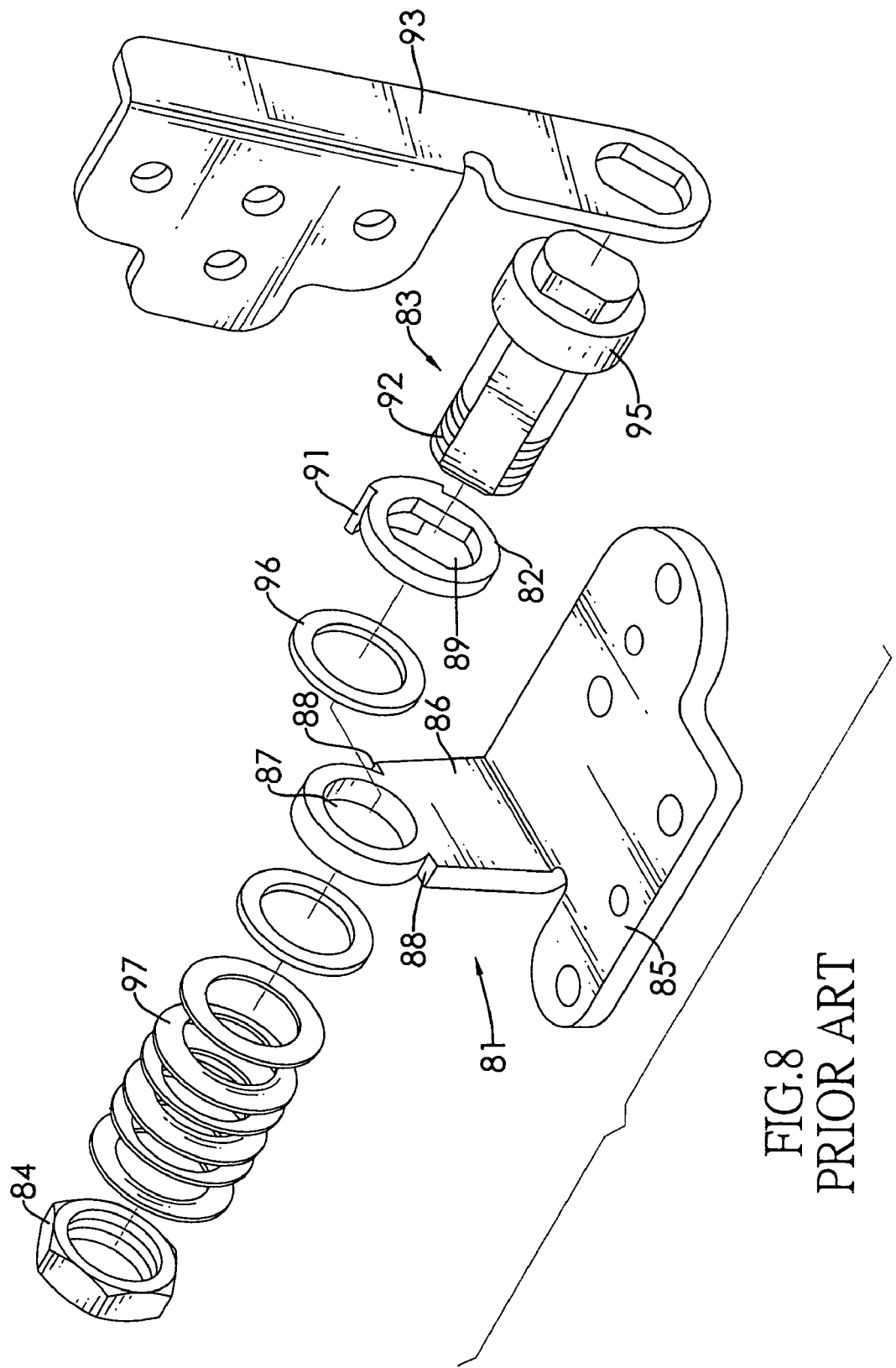
FIG. 8 is an exploded perspective view of a conventional hinge in accordance with the prior art mounted between a cover and a base.

With reference to FIGS. 4, 5 and 6, a second embodiment of a hinge in accordance with the present invention is almost similar to the first embodiment as described and further comprises a fixing element (50) and a ridge wheel (60).

The fixing element (50) has a first side, a second side, a through hole (53), two positioning protrusions (55) and two detents (57)(58), and is mounted around the shaft (70) adjacent to the lug (12) of the bracket (10).

The through hole (53) is formed through the fixing element (50).

The positioning protrusions (55) are formed on the first side of the fixing element (50) and correspond to and engage the positioning notches (15) of the lug (12) of the bracket (10).

The two detents (57)(58) are formed on the second side of the fixing element (50) along the through hole (53). Each detent (57)(58) is formed in multiple levels.

The ridge wheel (60) has a side, a fixing hole (63) and two ridges (67)(68), and is mounted securely on the shaft (70). The side of the ridge wheel (60) faces the second side of the fixing element (20).

The fixing hole (63) is formed through the ridge wheel (60) and is non-circular that the ridge wheel (60) is rotated with the shaft (70).

The ridges (67)(68) are formed on the side of the ridge wheel (60) and correspond to and selectively engage the detents (57)(58) on the second side of the fixing element (20). Each ridge (67)(68) is formed as multiple levels corresponding respectively to the detents (47)(58).

With further reference to FIG. 7A and FIG. 7B, the ridges (67)(68) initially engage the detents (57)(58) and then disengage the detents (57)(58) when the shaft (70) rotates the ridge wheel (60). The levels of the ridges (67)(68) and the levels of the detents (57)(58) allow the travel of the engagement be distinguished into dislocation steps. The dislocation steps provide the user to close or open the cover more gently when the user feels the approaching to the limit of the rotation range.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A hinge comprising
   a bracket comprising
      a plate; and
      a lug formed on and extending upward from the plate and having
         two lateral sides;
         a through hole formed through the lug,
         a fastening hole formed through the lug near the through hole, and
         at least one positioning notch formed on the lateral sides of the lug;
   a limiting element connected to the lug of the bracket and having
      a first side,
      a second side,
      a through hole formed through the limiting element and corresponding to the through hole in the bracket, a fastening hole formed through the limiting element near the through hole of the limiting element and corresponding to the fastening hole in the bracket, a limiting protrusion protruding from the second side of the limiting element; and at least one positioning protrusion protruding from the first side of the limiting element and corresponding to and engaging the at least one positioning notch of the bracket;

a shaft comprising a first end mounted through the limiting element and the lug of the bracket in sequence;

a second end;

a head formed between the first end and the second end of the shaft; and a stop formed on the head and selectively abutting against the limiting protrusion of the limiting element; and a pin mounted securely in the fastening holes of the limiting element and the lug of the bracket.

2. The hinge as claimed in claim 1 further comprising a spacer being annular and mounted around the shaft between the limiting element and the lug of the bracket.

3. The hinge as claimed in claim 1 further comprising a fixing element mounted around the shaft adjacent to the lug of the bracket and having a first side a second side, a through hole formed through the fixing element, at least one positioning protrusion formed on the first side of the fixing element and corresponding to and engaging the at least one positioning notch of the lug of the bracket; and at least one detent formed in multiple levels on the second side of the fixing element along the through hole; and a ridge wheel mounted securely on the shaft, and having a side facing the second side of the fixing element, a fixing hole formed through the ridge wheel and being non-circular; and at least one ridge formed on the side of the fixing element in multiple levels and corresponding to and selectively engaging the at least one detent on the second side of the fixing element.

\* \* \* \* \*